(12) United States Patent
Hasegawa et al.

(10) Patent No.: US 9,891,834 B2
(45) Date of Patent: *Feb. 13, 2018

(54) WRITING DATA SPANNING PLURALITY OF TAPE CARTRIDGES

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,871

(22) Filed: Nov. 17, 2016

(65) Prior Publication Data

US 2017/0068461 A1 Mar. 9, 2017

Related U.S. Application Data

(63) Continuation of application No. 14/849,671, filed on Sep. 10, 2015.

(30) Foreign Application Priority Data

Nov. 17, 2014 (JP) .................................. 2014-232638

(51) Int. Cl.
  *G06F 12/00* (2006.01)
  *G06F 3/06* (2006.01)
  *G11B 5/008* (2006.01)

(52) U.S. Cl.
  CPC ............ *G06F 3/0608* (2013.01); *G06F 3/061* (2013.01); *G06F 3/065* (2013.01); *G06F 3/0643* (2013.01);

(Continued)

(58) Field of Classification Search
  None
  See application file for complete search history.

(56) References Cited

U.S. PATENT DOCUMENTS 6,154,852 A * 11/2000 Amundson ......... G06F 11/1456
                                                                711/114
7,350,021 B2    3/2008 Itagaki et al.
(Continued)

FOREIGN PATENT DOCUMENTS

| JP | 10232800 A | 9/1998 |
| JP | 2009032331 A | 2/2009 |
| JP | 2014115807 A | 6/2014 |

OTHER PUBLICATIONS

Decision to Grant a Patent, Patent Application No. 2014-232638, Date of Drafting: Aug. 5, 2016, 6 pages.

(Continued)

*Primary Examiner* — Daniel Tsui
(74) *Attorney, Agent, or Firm* — Scott S. Dobson

(57) ABSTRACT

A method includes, in a tape apparatus system, receiving a request to write a file from a host, and, in response to the request, dividing sequentially received data of the file into two or more segments. Each of the two or more segments have a predetermined size. The method further includes sequentially writing a series of the two or more segments onto one or more tapes, and determining the predetermined size based on a capacity use efficiency of a plurality of other tapes and a time to copy when a spanning file, written by spanning on the one or more tapes, is copied to the plurality of other tapes. A corresponding computer program product and computer system are also disclosed.

8 Claims, 6 Drawing Sheets

(52) U.S. Cl.
CPC ........ *G06F 3/0686* (2013.01); *G11B 5/00817* (2013.01)

(56) References Cited

U.S. PATENT DOCUMENTS

| | | |
|---|---|---|
| 8,234,468 B1 | 7/2012 | Deshmukh et al. |
| 2009/0041234 A1 | 2/2009 | Gruba et al. |
| 2010/0046108 A1 | 2/2010 | Anna et al. |
| 2015/0046645 A1* | 2/2015 | Iwanaga ............... G06F 3/0682 711/111 |
| 2016/0139818 A1 | 5/2016 | Hasegawa et al. |

OTHER PUBLICATIONS

Notification of Reasons for Refusal, Patent Application No. 2014-232638, Date of Drafting: Jun. 27, 2016, 4 pages.

List of IBM Patents or Patent Applications Treated as Related, dated Nov. 16, 2016, pp. 1-2.

Hasegawa et al., "Method for Writing File by Spanning Onto Plurality of Tape Cartridges", Japan Application No. 2014-232638, filed Nov. 17, 2014, 33 pages.

* cited by examiner

REMARKS) • WRAP: GROUP OF TRACKS THAT IS READ AND WRITTEN AT SAME TIME BY HEAD (16 CHANNELS)
• WRAP TURN: HEAD TRAVELLING DIRECTION IS REVERSED AT EACH OF BOT AND EOT OF ADJACENT WRAPS

① ─◆─ TIME REQUIRED TO REWRITE SEGMENT
(time to rewrite segment [msec])

② ─■─ TIME REQUIRED TO WRITE INDICES ONTO DP 33 TIMES DUE TO PERIODIC SYNCHRONIZATION
(time to rewrite indices in DP [msec])

③ ┄▲┄ TOTAL REQUIRED TIME
(total time [msec])

WRITING DATA SPANNING PLURALITY OF TAPE CARTRIDGES

BACKGROUND

The present invention relates generally to the field of writing data across multiple tape cartridges, and more particularly to dividing a file into segments for writing onto tape media in a tape apparatus system.

Tape apparatus systems continue to be used for writing large data sets to long term storage. Such systems provide a platform for spanning a file system across multiple tape media, but users continue to face challenges writing very large data files that exceed the size of a single tape media element.

SUMMARY

A method includes, in a tape apparatus system, receiving a request to write a file from a host, and, in response to the request, dividing sequentially received data of the file into two or more segments. Each of the two or more segments have a predetermined size. The method further includes sequentially writing a series of the two or more segments onto one or more tapes, and determining the predetermined size based on a capacity use efficiency of a plurality of other tapes and a time to copy when a spanning file, written by spanning on the one or more tapes, is copied to the plurality of other tapes. A corresponding computer program product and computer system are also disclosed.

DETAILED DESCRIPTION

A linear tape file system (LTFS) is a method for using a tape medium as a file system as if the tape medium were a USB memory. IBM and other storage companies define formats, and publish implementations thereof. The LTFS divides the tape medium into two regions of an index partition (IP) and a data partition (DP). Meta-information (index) such as a file name is mainly recorded in the former, and the main body of the file is mainly recorded in the latter.

Figure 1:
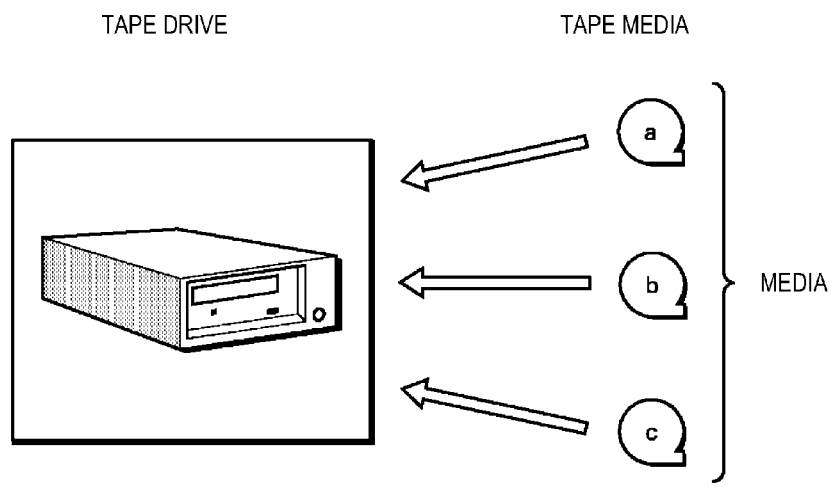
FIG. 1 illustrates a typical aspect in which a conventional LTFS divides and stores one file (by spanning) into a plurality of media.

FIG. 1 illustrates a typical aspect in which a conventional LTFS divides and stores one file (by spanning) into a plurality of media.

FIG. 1 illustrates an aspect in which a plurality of media are loaded/unloaded with respect to one drive. Typically, a storage system, such as a tape storage system, includes one or two or more tape drives, and a plurality of media use a plurality of drives. Reference symbols a, b, and c respectively denote the IDs of the media indicating the indices of the media, and the storage system such as a tape library identifies a target medium on the basis of the ID. It is discussed here that one drive is usable for spanning whereas other drives are used for other purposes. The first medium a is loaded (mounted) onto the one drive, and a head portion (first file portion) of a file is written thereonto. This drive stores metadata of the file as an index into the medium a. Then, the medium a is unloaded (unmounted), the next medium b is loaded onto the same drive, and a next file portion of the file is written thereonto. This drive stores metadata of the file as an index into the medium b. Then, the medium b is unloaded, the next medium c is loaded onto the same drive, and a next file portion of the file is written thereonto. This drive stores metadata of the file as an index into the medium c. At this moment, spanning of one file is completed. In the conventional LTFS, in the case where one file is written onto a plurality of media, writing onto the plurality of media cannot be expected at the start of the writing, and hence each medium independently stores each file portion.

Figure 2:
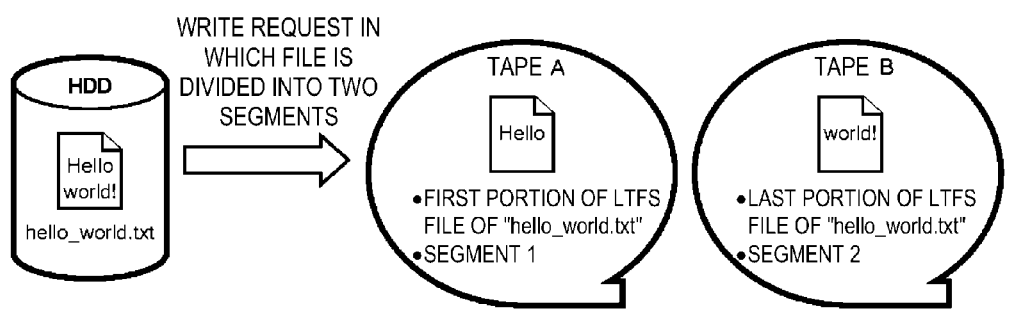
FIG. 2 illustrates a schematic diagram in which a LTFS divides one file into two segments, and writes the file as a spanning file onto a plurality of (for example, two) tapes.

FIG. 2 illustrates a schematic diagram in which a LTFS divides one file into a plurality of (for example, two) segments, and writes the file as a spanning file onto a plurality of (for example, two) tapes.

In a format defined by LTFS Format v2.2, a file "hello_world.txt", which is called a spanning file, is divided into a plurality of file portions (segments) to be stored into tape media. A first portion (Hello) of the LTFS file is allocated to a segment 1, and a last portion (world!) of the LTFS file is allocated to a segment 2. Conventionally, in the LTFS, one file cannot be stored across a plurality of tape media. For example, a file having a file size exceeding the capacity of a tape medium cannot be handled. As a result of support of a spanning file by the LTFS, one file "hello_world.txt" can be divided into two segments to be stored into two tape media. The first portion of the LTFS file of "hello_world.txt" is stored as the segment 1 into a Tape A. The last portion of the LTFS file of "hello_world.txt" is stored as the segment 2 into a Tape B.

In the LTFS, metadata (such as a file name, a file size, and a time stamp) called an index is mainly stored in the IP, and the main body of the file is mainly stored in the DP. At the time of writing a file onto a tape, the LTFS writes the index onto the DP periodically (for example, every five minutes) by means of a function of periodic synchronization. The periodic synchronization is also called periodic sync. The reason why the index is stored into not the IP but the DP at the time of the periodic synchronization is to reduce influences of the periodic synchronization on the time to write the file. The reason why the index is periodically written onto the tape medium is to protect the file, for example, in the case where power supply to the tape drive is cut off during the file writing. The utilization of the indices written due to the periodic synchronization enables identifying information of which portion of which file data that has been written onto the DP before then corresponds to. The volume of indices concerning each file is approximately 1 KB per file (approximately 1 GB per one million files), and the meta-information of every file stored in the tape medium is stored into the DP at the time of the periodic synchronization. Hence, as the number of files stored in the tape medium becomes larger, the ratio of indices to the DP region becomes higher, and the capacity for storing the main bodies of the files becomes smaller.

In the case where a spanning file cannot be stored into a storage destination at the time of copying the spanning file, it is necessary to store the corresponding segment into another tape medium again. Such rewriting normally takes three to four hours. In the case where a segment cannot be stored due to variations in index volume, the present invention aims at reducing the time to store the segment again.

At the time of copying a spanning file, the total volume of indices varies due to fluctuations in index writing timing resulting from the periodic synchronization. Such a variation in total volume of indexes leads to a problem that all segments written on one tape cannot necessarily be written onto another tape having the same capacity.

Accordingly, the present invention has an object to provide a writing method, a tape apparatus system, and a program in which a spanning file stored in a plurality of tapes is copied such that the storage use efficiency is not impaired.

In order to achieve the above-mentioned object, the present invention provides a method for dividing a file into a plurality of segments to write the file by spanning onto a plurality of tapes (tape cartridges), in a tape apparatus system including a tape apparatus connected to a host. This writing method includes the steps of: (a) receiving a request to write the file from an application of the host; (b) dividing sequentially received data of the file into segments each having a predetermined size, in response to the request; and (c) sequentially writing a series of the segments onto one or more tapes in order to store the file into the tapes. This writing method further includes a step of (d) determining the predetermined size of each segment on the basis of capacity use efficiency of a plurality of other tapes and a time to copy when the file (spanning file) that is written by spanning on the one or more of tapes is copied to the plurality of other tapes.

Figure 8:
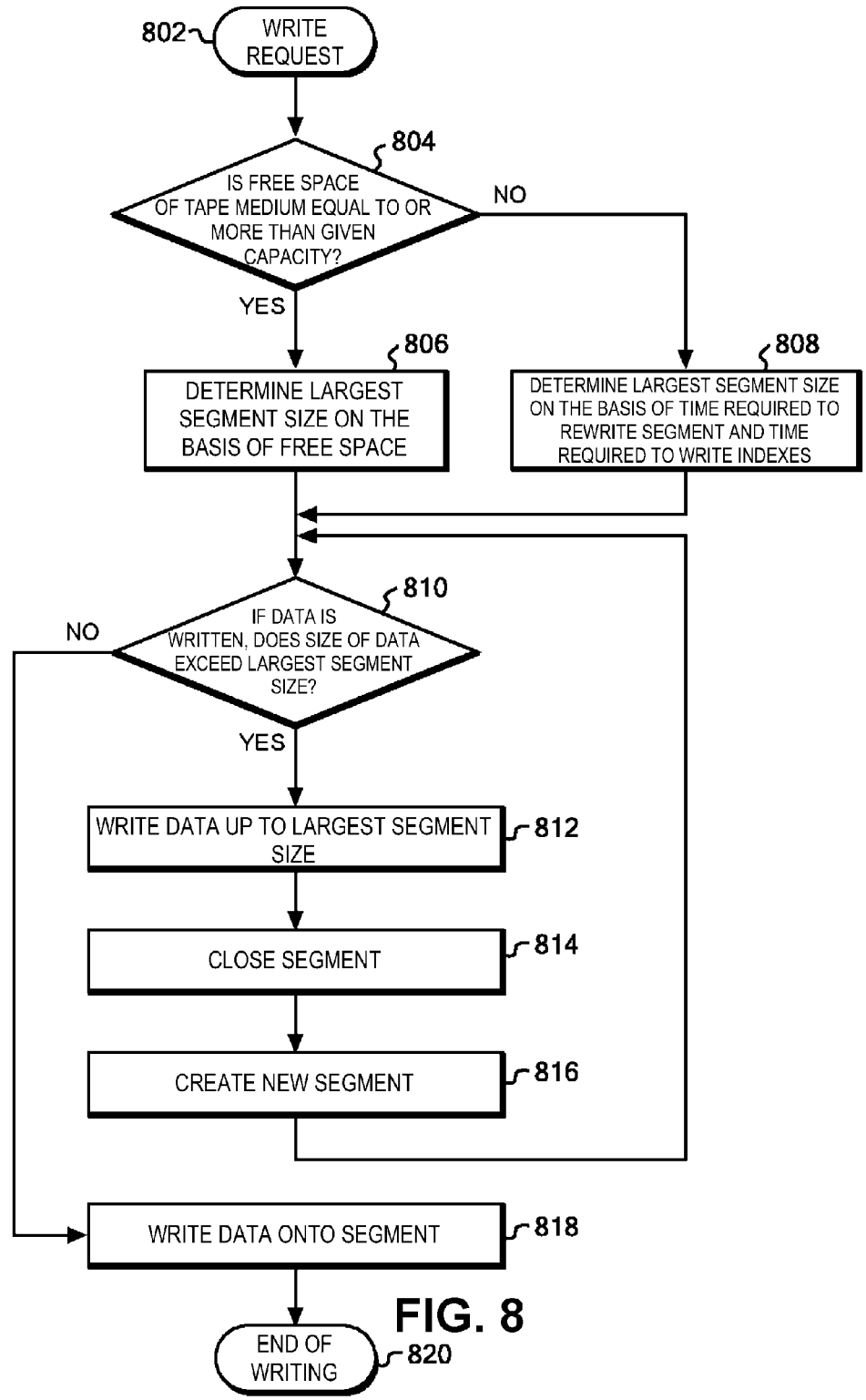
FIG. 8 illustrates a flowchart in which the LTFS writes a file by spanning according to an embodiment of the present invention.

Moreover, in this writing method, the step of (d) determining the predetermined size of each segment includes determining the predetermined size based on an amount of free space of the tape (Step 806 in FIG. 8).

Moreover, in this writing method, the predetermined size is determined so as to be smaller as the free space of the tape is smaller.

Moreover, in this writing method, the step of (d) determining the predetermined size of each segment is executed in a case where a value of the free space of the tape is equal to or more than a given rate.

Moreover, in this writing method, the predetermined size is determined such that the number of segments written onto and around a first portion of an entire storage capacity region of the tape is reduced.

Moreover, in this writing method, the predetermined size is determined such that a size of a segment written onto and around an end portion of an entire storage capacity region of the tape is smaller than a size of a segment written onto and around a first portion of the entire storage capacity region of the tape.

Further, in order to achieve the above-mentioned object, the present invention provides a method for copying a file (spanning file) that is written by spanning on a plurality of tapes as segments each having a predetermined size in a tape apparatus system, using the above-mentioned writing method. This copying method includes the steps of: (e) sequentially reading data of the spanning file written on a plurality of copy-source tapes in units of copy-source segments to yield read data; (f) sequentially writing the read data of the copy-source segments onto a plurality of copy-destination tapes in units of segments; and (g) rewriting the data of the copy-source segments onto a second tape of the plurality of copy-destination tapes in the step of (f) writing the data in units of segments, in a case where a free space up to an end of a storage capacity region of a first tape of the plurality of copy-destination tapes is smaller than the predetermined size of each segment and where writing onto the first tape is thus impossible.

Further, in order to achieve the above-mentioned object, the present invention provides a tape apparatus system executing the steps in the above-mentioned writing method.

Further, in order to achieve the above-mentioned object, the present invention provides a computer program causing a tape apparatus to execute the steps in the above-mentioned writing method.

Further, in order to achieve the above-mentioned object, the present invention provides a tape apparatus system executing the steps in the above-mentioned copying method.

Further, in order to achieve the above-mentioned object, the present invention provides a computer program causing a tape apparatus system to execute the steps in the above-mentioned copying method.

According to the above-mentioned writing method of the present invention, in the case where a spanning file written on a plurality of tapes is copied, impairment in tape capacity use efficiency and impairment in time to copy can be reduced.

Description is given below of an embodiment mode (embodiment) in which a file is written by spanning onto a plurality of tapes and the resultant spanning file is copied, in a tape apparatus system.

In the present invention, when a file is divided and written onto a plurality of storages, the size of each segment (file portion) of the file is determined in consideration of two points. The first point is the time to rewrite the segment. The second point is the time to write indices. Each segment of the file is determined on the basis of the two points, whereby a copy of the file that is divided and stored in the storages can be created without impairment in storage capacity use efficiency.

Figure 3:
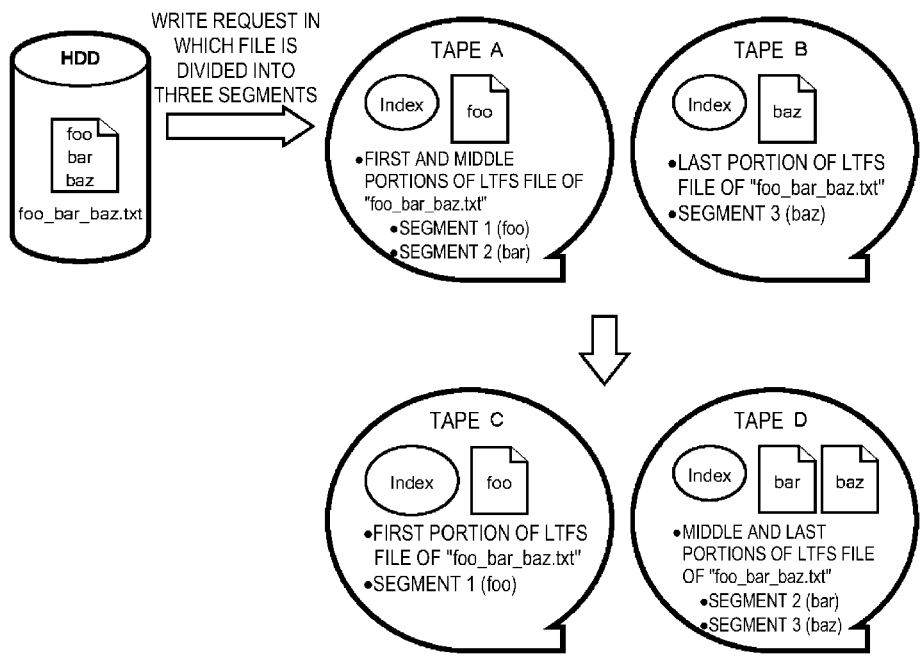
FIG. 3 illustrates a schematic diagram in which, at the time of creating a copy of a spanning file divided into three segments, the LTFS writes the segments onto a plurality of other tapes.

FIG. 3 illustrates a schematic diagram in which, at the time of creating a copy of a spanning file divided into three segments, a LTFS writes the segments onto a plurality of other tapes.

The conditions of used tape drives and communication lines are different between copy-source tapes A and B used at the time of creating the spanning file and copy-destination tapes C and D used at the time of copying the spanning file. Hence, at the time of creating the copy of the spanning file, the total volume of indices varies due to fluctuations in index writing timing resulting from periodic synchronization. FIG. 3 illustrates that a tape into which a middle segment 2 of the spanning file is stored is shifted due to this variation in total volume. A file "foo_bar_baz.txt" is divided into three segments (segments 1, 2, and 3) of a first portion (foo), a middle portion (bar), and a last portion (baz), and is stored as the spanning file into two tapes. The segment 1 to which the first portion (foo) of the file is allocated and the segment 2 to which the middle portion (bar) of the file is allocated are stored in the tape A. The segment 3 to which the last portion (baz) of the file is allocated is stored in the tape B. In this manner, the one file is divided into the three segments, and is written as the spanning file on the two tapes. Meanwhile, in copying the spanning file, assuming that the segment 2 to which the middle portion (bar) is allocated cannot be housed in the tape C, only the segment 1 of the first portion (foo) is stored in the tape C. The segment 2 to which the middle portion (bar) is allocated and the segment 3 to which the last portion (baz) is allocated are stored in the tape D. At this copying time, the total volume of indices in the tape A becomes larger than the total volume of indices in the tape C, so that the segment cannot be housed in the tape C. In FIG. 3, the condition where the total volume of indices stored in the tape C increases is expressed by making the elliptical icon of the tape C larger than that of the tape A. If the writing transfer rate at the time of creating the copy of the spanning file in the tapes C and D is different from the transfer rate at the time of writing the spanning file onto the tapes A and B, the data volume of indices varies due to the periodic synchronization. For example, the transfer rate at the time of writing the spanning file onto the tapes C and D can be lower than the transfer rate at the time of writing the spanning file onto the tapes A and B. If the transfer rate is low and the time to write is thus lengthened, the number of times of the periodic synchronization during writing onto one tape becomes larger, and hence the total volume of indices increases. In this case, the data volume of indices written onto the tapes C and D is larger than onto the tapes A and B. Because a larger number of segments are written onto the tapes C and D within a given time, a larger data volume of indices is also written thereonto accordingly at the synchronization timing. Because a large data volume of indices is written onto the DP of the tape C, the tape C cannot secure a remaining capacity for storing data of the segment 2 corresponding to the middle portion of the file. Hence, if the file system (LTFS) tries to write the segment 2 corresponding to the middle portion onto the tape C, the writing operation is failed, and the LTFS receives an error response. Because the data of the same segment 2 needs to be rewritten onto the next tape D, it is necessary to spend an extra time. The extra time is called the time to rewrite the segment (time to rewrite segment).

If a fifth-generation linear tape open (LTO) tape medium is formatted in the LTFS format, the capacity of the DP thereof becomes 1.425 TB. In the case of storing a file having a size exceeding the capacity of the DP, the file is divided into segments each having a predetermined size of a given rate (for example, 100 MB) to the capacity of the DP. That is, 10,000 segments (foo_bar_baz.txt-LTFSseg1 to foo_bar_baz.txt-LTFSseg10000) are stored into one tape medium (tape X). The subsequent segments (foo_bar_baz.txt-LTFSseg10001 to foo_bar_baz.txt-LTFSseg20000) are stored into another tape medium (tape Y). In this way, particularly in the case where a segment cannot be stored into one tape medium at the time of creating a copy, the time to store the segment into another tape medium can be reduced to be equal to or less than 0.01% of the conventional case.

In order to describe the embodiment of the present invention, the LTFS format, the tape drive, and file data writing by the LTFS are described.

Figure 4:
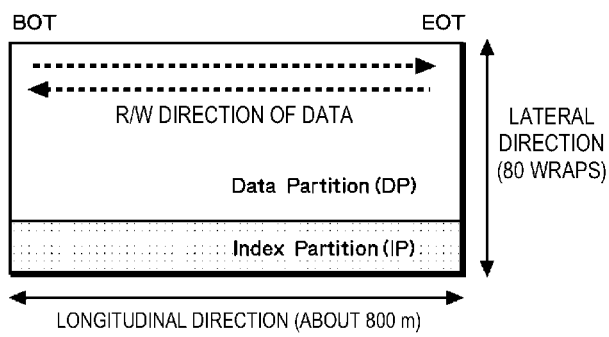
FIG. 4 illustrates a tape divided into two partitions of the LTFS.

FIG. 4 illustrates a tape divided into two partitions of the LTFS.

A LTO5 tape drive writes data while moving back and forth on wraps of a write region along the longitudinal direction of the tape. In the LTFS, two (corresponding to one round trip) of the wraps are used as an index partition. The tape is divided into the two partitions (IP and DP) from the beginning of the tape (BOT) to the end of the tape (EOT). A unit for a head to read and write at the same time is a track, and sixteen tracks correspond to one wrap. In a tape cartridge of the LTO5, the tape has a length of about 800 m in its longitudinal direction, and has a width corresponding to eighty wraps in its lateral direction. The IP and the DP are separated from each other by a protection region (guard band) configured by two wraps. The tape moves back and forth in the wrap longitudinal direction, and the motion that the travelling direction is reversed at each of the BOT and the EOT is called wrap turn. The time required for the tape to move from the BOT to the EOT in the longitudinal direction with respect to the head of the tape drive is 60 to 90 seconds. The time required for the tape to move up to the half in the longitudinal direction is about 30 to 45 seconds.

In the file system for the tape drive, for example, the LTFS, data written on a medium can be shown as a file. If a user writes data onto a tape medium using the LTFS, meta-information called an index file (or simply called an index) is written onto the tape medium, in addition to the file main body. The index includes, as the meta-information, a directory name, a file name, a file creation date, and position meta-information including a position on the medium, a size, and an offset in the file, in the XML format. Moreover, in the case where one file is divided into a plurality of segments, the index also includes meta-information relating to the segments. The latest index is mainly written onto the IP. The sequentially added and changed file main body and the index history relating thereto are appended and written onto the DP of the medium.

In the case where a file on a tape medium is read and written using the LTFS, data is read and written in units called record. The record is called block in the LTFS, and a LTFS format is given thereto. Each block is managed for each partition in which the data of the file is recorded, on the basis of a block number indicating how many blocks precede this block from the beginning of the partition. The index of each file includes the position information indicated by the block numbers corresponding to the data of the file.

Figure 5:
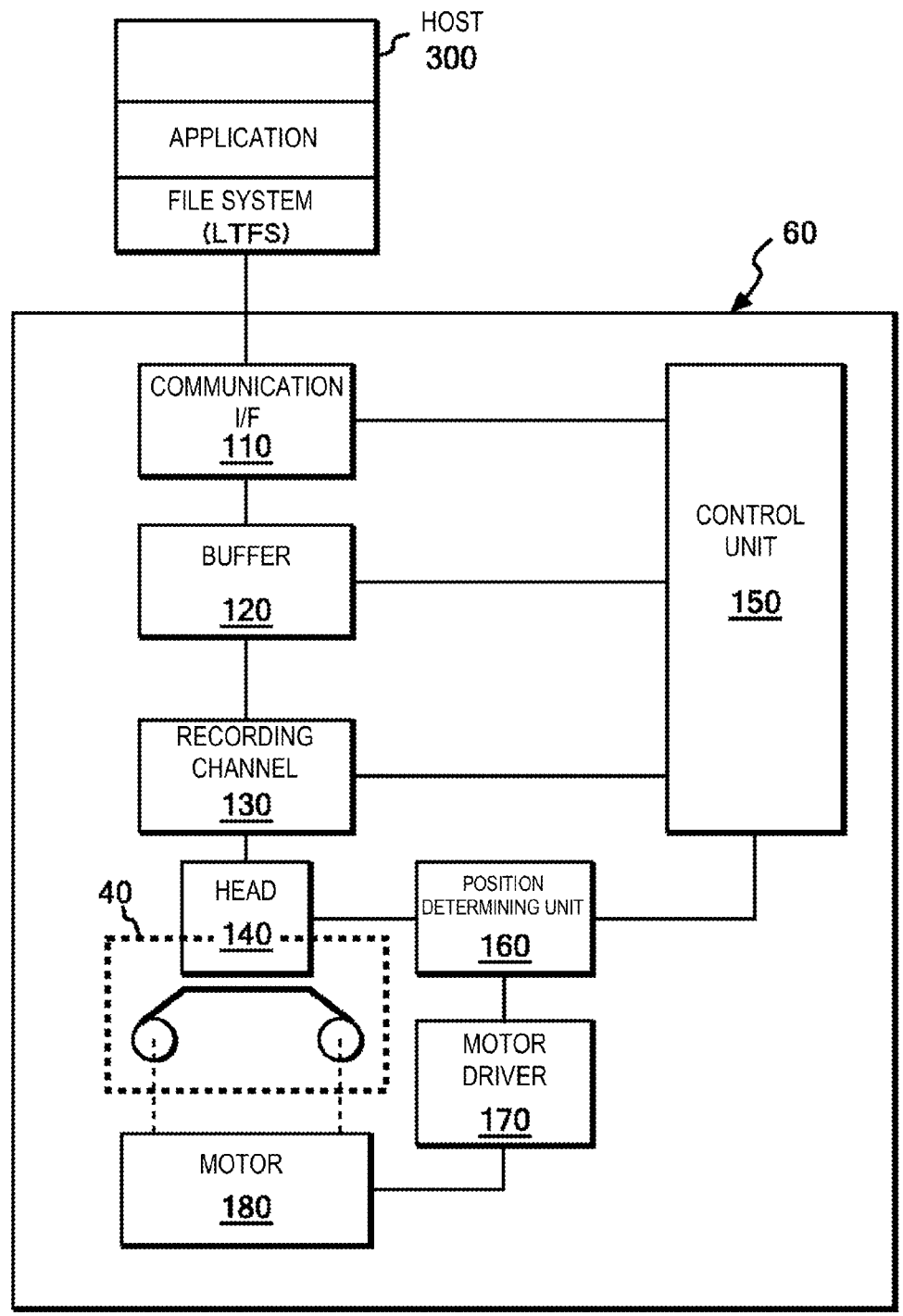
FIG. 5 illustrates a hardware configuration of a tape storage system (tape apparatus system) including a tape apparatus connected to a host.

FIG. 5 illustrates a hardware configuration of a tape apparatus system including a tape drive (tape apparatus) connected to a host.

A tape drive 60 receives a request to read and write a file from an application of a host 300 via a file system (LTFS). The tape drive includes a communication interface (I/F) 110, a buffer 120, a recording channel 130, a reading and writing head 140, a control unit 150, a position determining unit 160, a motor driver 170, and a motor 180.

The interface 110 communicates with the host 300 via a network. For example, the interface 110 receives a write command for giving an instruction to write data onto a tape cartridge (a tape, a medium) 40, from the host 300. Further, the interface 110 receives a read command for giving an instruction to read data from the medium 40, from the host 300. The interface 110 has a function of compressing the written data and decompressing the read data, and increases the storage capacity to the medium close to about twice the actual data size.

The tape drive 60 reads and writes data with respect to the medium 40 in units of a data set (referred to as DS) constructed by a plurality of records sent from the application of the host 300. A typical size of the DS is 4 MB. The application of the host 300 designates a file name using a file system (for example, the LTFS-API: Application Program Interface), and issues read and write access to the tape drive

60. The file system sends a request to write and read records in a SCSI command level to the tape drive. The DS is constructed by the plurality of records.

Each DS includes management information concerning the data set. User data is managed in units of a record. The management information is included in a data set information table (DSIT). The DSIT includes the number of records or blocks and the number of file marks (FMs) included in the DS, as well as the number of cumulative records and the number of cumulative FMs written from the beginning of the medium.

The buffer 120 is a memory in which data to be written onto the medium 40 and data read from the medium are temporarily accumulated. For example, the buffer 120 is configured by a dynamic random access memory (DRAM). The recording channel 130 is a communication path used to write data accumulated in the buffer 120 onto the medium 40 or temporarily accumulate data read from the medium 40 into the buffer 120.

The reading and writing head 140 includes a data reading and writing element, and writes data onto the medium 40 and reads data from the medium. The reading and writing head 140 according to the present embodiment further includes a servo reading element, and reads a signal from a servo track provided to the medium 40. The position determining unit 160 instructs the reading and writing head 140 to move in the lateral direction (width direction) of the cartridge 40. The motor driver 170 drives the motor 180.

The tape drive 60 writes data onto the tape and reads data from the tape in accordance with a command received from the host 300. The tape drive 60 includes the buffer, a reading and writing channel, the head, the motor, reels on which the tape is wound, a read and write controller, a head position controlling system, and the motor driver. The tape cartridge is unloadably loaded on the tape drive. The tape moves in the longitudinal direction along with reel rotations. The head moves in the tape longitudinal direction to write data onto the tape and read data from the tape. Further, the tape cartridge 40 includes a non-contact non-volatile memory called cartridge memory (CM). The CM loaded on the tape cartridge 40 is read and written by the tape drive 60 in a non-contact manner. The CM stores a cartridge attribute therein. At the time of reading and writing, the tape drive takes out the cartridge attribute from the CM to enable optimal reading and writing.

The control unit 150 controls the entire tape drive 60. That is, the control unit 150 controls data writing onto the medium 40 and data reading from the medium 40, in accordance with a command received by the interface. Further, the control unit 150 controls the position determining unit 160 in accordance with a signal read from a servo track. Moreover, the control unit 150 controls a motion of the motor by means of the position determining unit 160 and the motor driver 170. Note that the motor driver 170 may be directly connected to the control unit 150.

A specific method for writing a spanning file according to the present invention is described.

Figure 6:
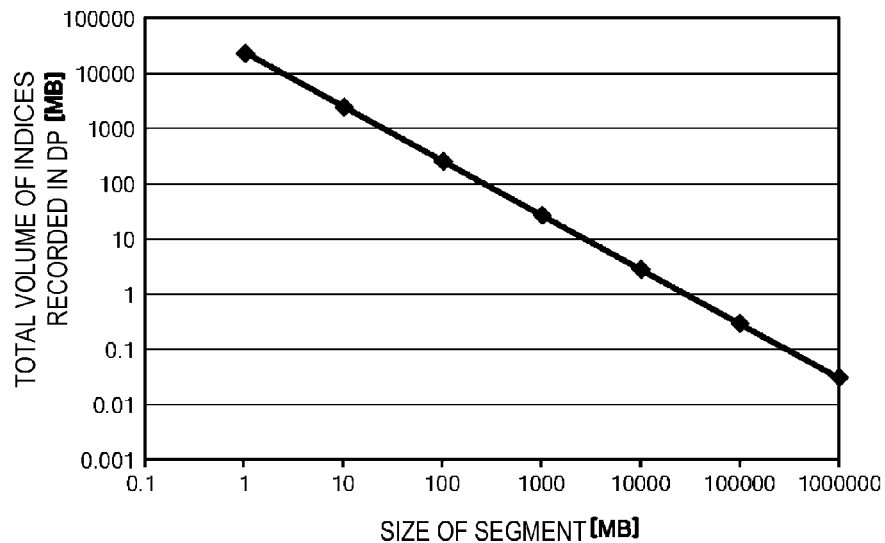
FIG. 6 illustrates a correlation between the size of each segment and the total volume of indices recorded in a DP.

FIG. 6 illustrates a correlation between the size of each segment and the total volume of indices recorded in a DP.

As the segment size is made smaller, the time to rewrite the segment can be more reduced. On the other hand, as the segment size is made smaller, the number of segments stored in one tape medium becomes larger, leading to an increase in volume of indices. The transfer rate at the time of reading and writing data with respect to the fifth-generation LTO tape medium is 140 MB/sec. At this rate, it takes 169 minutes (=1.425 [TB]*1,000*1,000/140 [MB/sec]/60) to fill the DP with the file. This means that index writing occurs 33 times due to the periodic synchronization during the writing. In FIG. 6, the size of each segment and the total volume of indices in the DP are illustrated in a graphic form. If the segment size is 10 GB, the total volume of indices recorded in the DP is a little less than 3 MB. Conversely, for example, if the segment size is 1 MB, the total volume of indices recorded in the DP is as large as 23 GB.

Figure 7:
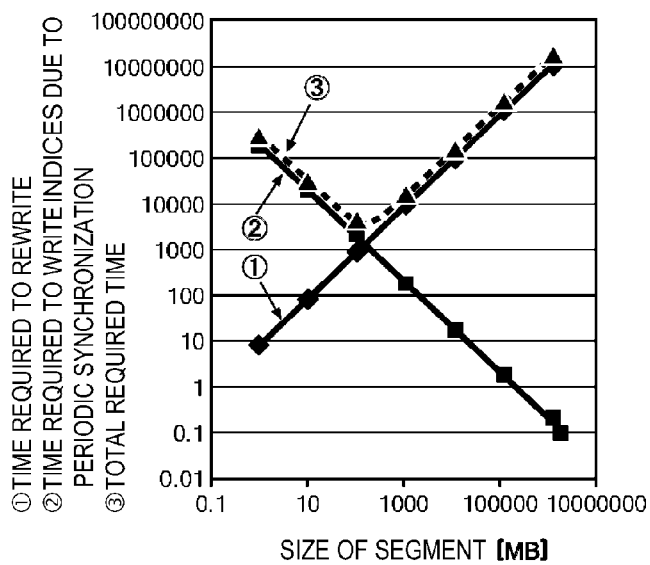
FIG. 7 illustrates a relation between: the size of each segment; and each of the time to rewrite the segment, the time to write indices due to periodic synchronization, and the total required time.

FIG. 7 illustrates a relation between the size of each segment and the total required time of each of the time to rewrite the segment and the time to write indices due to the periodic synchronization.

In copying a spanning file, the storage capacity use efficiency depends on a first factor, a second factor, and a third factor given below. When a specific segment is written onto one or more tapes immediately before the end of the tape in the course of sequentially writing a series of segments, if the free space up to the storage region end of the tape is exceeded, a writing error occurs. The specific segment for which the writing error occurs needs to be rewritten onto the next tape, and the time to rewrite (first factor) refers to the time for this rewriting. The time to write meta-information (indices) onto the DP due to the periodic synchronization (second factor) becomes overhead in copying. For example, 33-time index writing due to 33-time synchronization becomes a factor for an increase in time to write. The total required time (third factor) refers to the evaluation time at the time of creating the copy of the spanning file. In FIG. 7, the total required time is the sum of the time to rewrite (first factor) and the time to write indices due to the periodic synchronization (second factor). From the perspective of required time, a segment size (approximately 100 MB) at which the time to rewrite the segment and the time to write indices become smallest is preferable. Moreover, also from the perspective of effective utilization of the capacity of the tape medium, this value of 100 MB is preferable because 100 MB is as small as 0.001% of the capacity (1.425 TB) of the DP. Also from the perspective of influences exerted when a segment cannot be written, this value is preferable.

In the present invention, at the time of copying a spanning file, the segment size is changed as appropriate so as to suit each situation such that the tape storage use efficiency is not impaired. In the above-mentioned embodiment, description is given of an example in which the size of every segment is set to be the same. For example, the segment size may be changed so as to suit the free space of a tape medium. Only when the free space is equal to or less than a given value (for example, 10 GB) or a given rate (10%), the present invention may be applied. When the free space is equal to or more than a given value or a given rate, the segment size may be determined so as to suit the free space. For example, it is conceivable that the segment size is set to 10% of the free space of the tape medium. The time to write indices can be reduced by reducing the number of segments to be stored into a first portion of the tape medium.

FIG. 8 illustrates a flowchart in which the LTFS writes a file by spanning according to an embodiment of the present invention.

FIG. 8 illustrates a spanning aspect of the present invention in the case where a request to write a file is received in FIG. 2 and FIG. 3. The file system (LTFS) may divide a large-size file into a plurality of segments and may perform the following steps on one or more tapes. Moreover, an application using the LTFS may perform a similar process.

Step 802 corresponds to the case where the file system (LTFS) receives a write request from an application of a host.

At Step 804, the LTFS determines whether or not the free space of a tape cartridge is equal to or more than a given capacity or a given rate. The LTFS determines the size of each segment (segment size) for dividing the file on the basis of the free space.

At Step 806, if the free space of the tape cartridge is equal to or more than the given capacity (YES in Step 806), the LTFS can select a largest segment size on the basis of the free space of the tape cartridge.

At Step 808, if the free space of the tape cartridge is less than the given capacity (NO in 806), the LTFS determines the largest segment size on the basis of the time to rewrite the segment (first factor) and the time to write indices (second factor).

At Step 810, the LTFS determines whether or not the size of data of the file sequentially sent from the application exceeds the largest segment size, if this data is written.

At Step 812, the LTFS can write the data of the file up to the largest segment size.

At Step 814, the LTFS closes this segment.

At Step 816, the LTFS creates a new segment for subsequent data of the file received from the application.

At Step 818, if the size of the data of the file sent from the application does not exceed the largest segment size (NO in Step 810), this data can be regarded as the data at the end of the file. In this case, the LTFS writes this data as the final segment onto the tape.

At Step 820, after the final segment of the file is written in Step 818, the LTFS ends the file writing by spanning.

Figure 9:
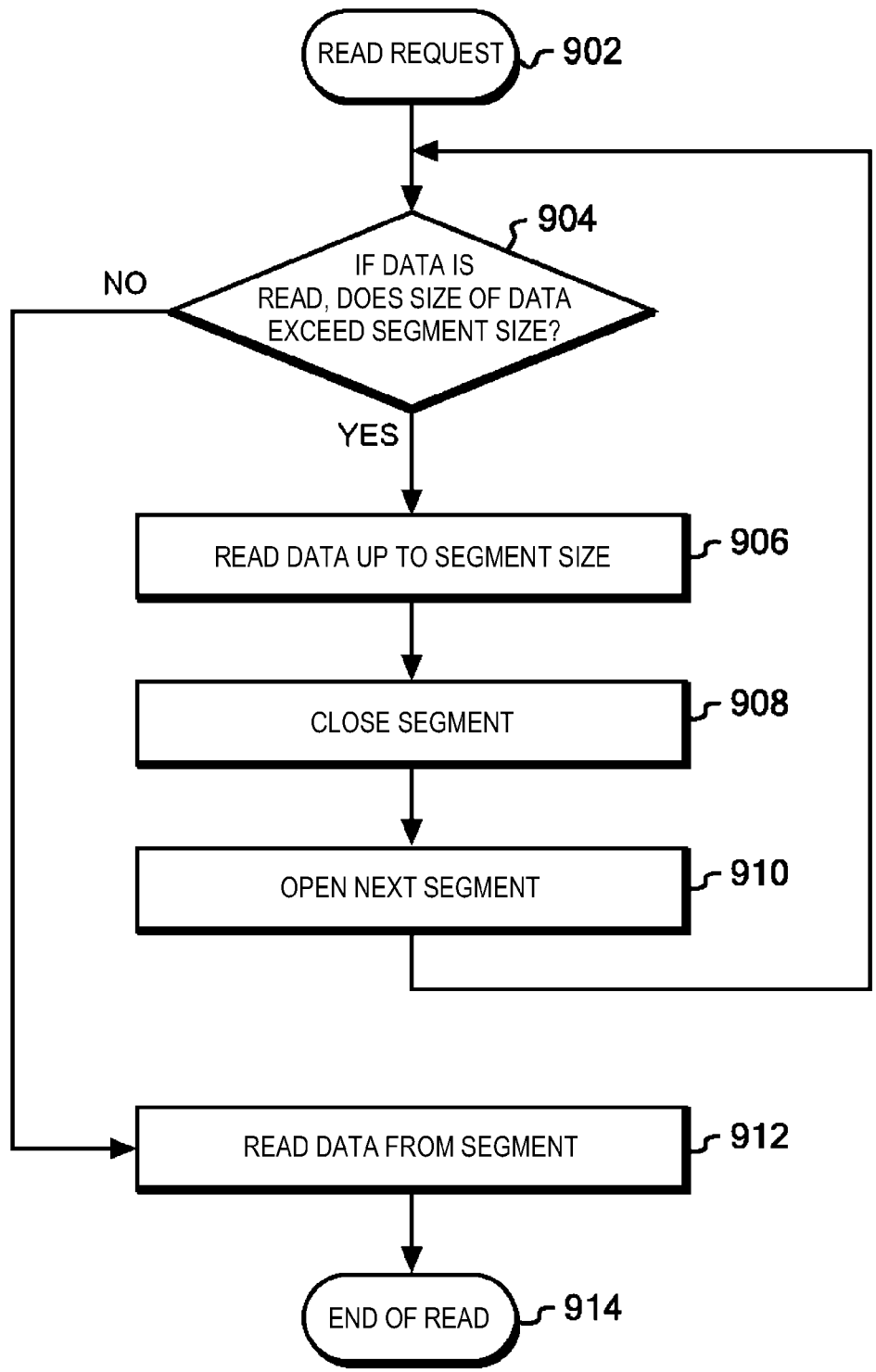
FIG. 9 illustrates a flowchart in which the LTFS reads a spanning file.

FIG. 9 illustrates a flowchart in which the LTFS reads a spanning file.

The spanning file is read from the copy-source tapes A and B using this read method, and is written onto the copy-destination tapes C and D in units of segments, so that a copy of the spanning file is created (see FIG. 3).

Step 902 corresponds to the case where the file system (LTFS) receives a request to read a file, from an application of a host.

At Step 904, the LTFS determines whether or not the size of sequential data that is sequentially read for the file designated by the read request exceeds a segment size. The LTFS can identify that the requested file is a divided spanning file, with reference to indices stored in the tapes.

At Step 906, if the size of the read sequential data exceeds the segment size (YES in Step 904), the LTFS identifies a segment obtained by dividing the file, and reads data up to the segment size.

At Step 908, the LTFS closes this segment.

At Step 910, the LTFS identifies a next segment including subsequent data of the requested file, and opens the next segment.

At Step 912, if the size of the sequential data that is read for the requested file does not exceed the segment size (NO in Step 904), data of the segment at the end of the file is read.

At Step 914, after the final data, that is, the final segment of the file is read in Step 912, the LTFS ends the read.

The write request and the read request are described with reference to these flowcharts. In actuality, an open or create request is given before these requests, and, in the case of the open request, a seek request is given after opening and before writing/read. In opening/creating, a head segment is opened/created. Subsequently, in seeking, if the seeking target is located in the head segment, positioning is performed with respect to a corresponding position in the head segment. If the segment size is exceeded, positioning is performed with respect to a corresponding position in the second or subsequent segment.

Description is given of an embodiment in which a spanning file is copied using the writing (spanning) method and the read method of the present invention. It is discussed here that, as illustrated in FIG. 3, the segment 1, the segment 2, and the segment 3 of the spanning file "foo_bar_baz.txt" stored in the tapes A and B are copied to the tapes C and D. In particular, if the volume of written data including data of the segments 1 and 2 becomes larger along with an increase in volume of indices at the time of copy writing, an error occurs in the final stage of writing onto the tape C. This is because the free space up to the end of the storage capacity region of the copy-destination tape C is smaller than the total data volume of the segments 1 and 2 and the indices. Because the data of the segment 2 cannot be written onto the tape C, an extra time to rewrite the data onto the tape D (the time to rewrite the segment) is necessary. If this retry time is long, creation of a copy of the spanning file takes too much time. Moreover, because the data of the segment 2 is not written onto the tape C, the free space up to the end of the storage region of the tape C is wasted, so that the storage capacity use efficiency is impaired. If the sizes of the segments 1 and 2 are made small to some extent at the time of creating the spanning file, harmful influences of rewriting can be reduced. However, if the segment size is made excessively small, the number of segments increases, and the total volume of indices increases, so that the storage capacity use efficiency decreases. Accordingly, in the present invention, the segment size at the time of writing the spanning file is determined in consideration of a balance between the capacity use efficiency of the copy-destination tape and the time to copy.

As has been described above, according to the writing method of the present invention, in the case where a spanning file written on a plurality of tapes is copied, impairment in tape capacity use efficiency and impairment in time to copy can be reduced. Note that the present invention is described by way of the embodiment mode (embodiment), but the scope of the present invention is not limited to the above-mentioned embodiment. It is obvious for those skilled in the art that various changes and alternative modes can be adopted without departing from the spirit and scope of the present invention.

TABLE 1

Reference Numbers List

| REF. | NAME |
| --- | --- |
| 40 | tape cartridge (medium, tape) |
| 60 | tape drive (tape apparatus) |
| 110 | communication interface (I/F) |
| 120 | buffer |
| 130 | recording channel |
| 140 | reading and writing head |
| 150 | control unit (including controller and read and write controller) |
| 160 | position determining unit |
| 170 | motor driver |
| 180 | motor |
| 300 | host (including user application and file system) |

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A tape apparatus system comprising:
    means for receiving a request to write the file from a host;
    means for dividing sequentially received data of the file into segments each having a predetermined size, in response to the request;
    means for sequentially writing a series of the segments onto one or more tapes in order to store the file into the tapes; and means for determining the predetermined size of each segment on the basis of capacity use efficiency of a plurality of other tapes and a time to copy when a spanning file that is written by spanning on the plurality of tapes is copied to the plurality of other tapes.

2. The system according to claim 1, wherein the determining the predetermined size of each segment includes determining the predetermined size on the basis of a free space of the tape.

3. The system according to claim 1, wherein the determining the predetermined size of each segment includes determining the time to copy when the spanning file is copied to the plurality of other tapes, on the basis of a time to rewrite the segment and a time to write meta-information of the segment.

4. The system according to claim 2, wherein the predetermined size is determined so as to be smaller than the free space of the tape.

5. The system according to claim 3, wherein the determining the predetermined size of each segment is executed in a case where a value of the free space of the tape is equal to or more than a given rate.

6. The system according to claim 3, wherein the predetermined size is determined such that the number of segments written onto a first portion of an entire storage capacity region of the tape is reduced.

7. The system according to claim 3, wherein the predetermined size is determined such that a size of a segment written onto and around an end portion of an entire storage capacity region of the tape is smaller than a size of a segment written onto a first portion of the entire storage capacity region of the tape.

8. A tape apparatus system comprising:
  means for sequentially reading data of the spanning file written on copy-source tapes in units of segments;
  means for sequentially writing the read data of the segments onto a plurality of copy-destination tapes in units of segments; and
  means for rewriting the data of the segments onto a second tape of the plurality of copy-destination tapes, in a case where a free space up to an end of a storage capacity region of a first tape of the plurality of copy-destination tapes is smaller than the predetermined size of each segment and where writing onto the first tape is thus impossible.

* * * * *